United States Patent [19]

Moore

[11] Patent Number: 5,314,565
[45] Date of Patent: May 24, 1994

[54] PORTABLE SPLICE TAPING MACHINE

[76] Inventor: Marshall N. Moore, 1314 Apple Orchard La., Troutville, Va. 24175

[21] Appl. No.: 44,106

[22] Filed: Apr. 9, 1993

Related U.S. Application Data

[63] Continuation of Ser. No. 827,755, Jan. 29, 1992, abandoned.

[51] Int. Cl.$^5$ ............................................. B31C 1/00
[52] U.S. Cl. ................................. 156/392; 156/425; 156/428; 242/7.19
[58] Field of Search ............... 156/392, 431, 432, 425, 156/428, 468, 486, 429; 242/7.21, 7.22, 7.23, 7.19

[56] References Cited

U.S. PATENT DOCUMENTS

| | | | |
|---|---|---|---|
| 1,998,909 | 4/1935 | Rosener | 156/392 |
| 2,070,925 | 2/1937 | Rolfs et al. | 242/7.22 |
| 2,253,848 | 8/1941 | Cummings | 156/392 |
| 2,344,264 | 3/1944 | Perrault | 156/392 |
| 2,556,827 | 6/1951 | Striano | 242/7.19 |
| 2,609,155 | 9/1952 | Fosnaugh | 242/7.19 |
| 3,128,216 | 4/1964 | Reed | 242/7.22 |
| 3,448,506 | 6/1969 | Bishop et al. | 242/7.19 |
| 3,470,057 | 9/1969 | Stuart, Jr. et al. | 156/486 |
| 3,547,731 | 12/1970 | Stuart, Jr. et al. | . |
| 3,616,061 | 10/1971 | Carter | 156/431 |
| 4,008,114 | 2/1977 | Lindsey | . |
| 4,089,727 | 5/1978 | McLain | 156/431 |
| 4,204,905 | 5/1980 | Miyamoto | 156/468 |
| 4,279,684 | 7/1981 | Mason | 242/7.19 |
| 4,315,606 | 2/1982 | Seiders | 242/7.19 |
| 4,322,262 | 3/1982 | Cottam | 156/468 |
| 4,707,214 | 11/1987 | Nithart et al. | . |

Primary Examiner—David A. Simmons
Assistant Examiner—William J. Matney, Jr.
Attorney, Agent, or Firm—Richard C. Litman

[57] ABSTRACT

A taping machine particularly suited to the taping of an electrical cable splice includes a planar base, a traveling tape dispenser, and supports for the cable. The tape dispenser is of split construction to accommodate being assembled on site to surround the cable. During a taping operation the tape dispenser, powered by a motor, rotates around the cable. Travel along the cable is powered by a separate motor. Speeds of both motors are independently adjustable.

11 Claims, 6 Drawing Sheets

PORTABLE SPLICE TAPING MACHINE

CROSS-REFERENCE TO RELATED APPLICATION

This is a continuation of Ser. No. 07/827,755, filed Jan. 29, 1992, now abandoned.

FIELD OF THE INVENTION

The present invention relates to a machine for taping an elongate member, and more particularly for taping a spliced electrical cable connection.

DESCRIPTION OF THE PRIOR ART

The prior art discloses portable machines for wrapping elongate members with tape or the like. In each case, the machine mounts on the member being wrapped, in most cases being fully supported on this member.

U.S. Pat. No. 4,707,214, issued to Nithart et al. on Nov. 17, 1987, discloses a machine which wraps an electrical conductor with tape. Because this invention is uniquely intended for use with a bus bar, it incorporates rollers tightly held to the bus bar to support itself. The same motor both rotates the tape dispensing means around the electrical conductor and also moves the machine axially along the conductor.

U.S. Pat. No. 3,547,731, issued to Stuart, Jr. et al. on Dec. 15, 1970, provides a manually operated pipe joint wrapping machine. This machine is moved along the pipe manually and the supply of wrap is rotated manually around the pipe in a separate operation. The correlation between rates of travel and rotation are therefore subject to a delicate balance of an operator's divided attention to each. This includes visual observation as well as dexterity in manipulating the appropriate controls.

U.S. Pat. No. 4,008,114, issued to Lindsey on Feb. 15, 1977, discloses manual or powered rotation of the tape supply about a pipe, but provides no details enabling selectively variable rate of tape application. Moreover, axial movement is linked to rotation rate by rollers bearing against the pipe with angularity such that rotation also imparts axial travel. This obstructs the ability of the operator to vary the two rates, thus varying the degree of overlap of each new layer of tape over the previous layer.

SUMMARY OF THE INVENTION

By the present invention, an improved taping machine is disclosed which has a planar base, two projections to support a cable, means to rotate a supply of tape about the cable to effect wrapping, and means to move the supply of tape axially along the cable. The combination of rotation and axial movement of the tape supply provide a constant, even application of tape to the cable.

The nature of cable as opposed to other items which may be taped entails special problems. Unlike the pipes or electrical bus bar of the above cited patents, cable is frequently stranded. Therefore, there is less rigidity than is present in pipes or bus bar. Also, electrical cables are usually run horizontally. For these reasons, cables tend to deflect if called upon to support a taping machine or the like. Furthermore, the purpose of taping is to protect a spliced connection, which, lacking the strength and rigidity of a solid member, should be spared being deflected by a load. In light of these conditions, it is clear that taping equipment designed to support itself on the item being taped is unsuitable with respect to electrical cable.

The support of the cable by the machine of the present invention, and the support of the machine on a surface other than the cable, solve the problem of potentially weakening the very joint being protected.

Another aspect to be considered is that a large electrical cable may conduct very high voltage power, requiring carefully controlled application of tape. Tight, even application having a precise degree of tape overlap may be critical. The present invention provides an unmatched degree of control over the application of tape.

The rate of feed from the supply spool and the speed of travel axially along the cable may be precisely and independently controlled by the user. This avoids an uneven buildup of tape at any point along the cable. It also permits an operator to build up a layer of tape where desired, such as to even out such areas as splices where the cable may abruptly increase in diameter.

The machine holds the tape at a desirable degree of tension automatically. This permits an operator to abandon using the machine periodically and still maintain the quality of the taping application.

The machine may be readily disassembled for portability and for assembly surrounding a cable, the ends of which may be distant or inaccessible. Job site conditions may further require that the taping be done in very tight quarters, as is frequently encountered in a manhole or in an equally inconvenient location. One example actually being encountered in manholes is the mounting of cables within one foot of a wall.

Such manholes frequently contain other cables which may be live and conducting very high voltage. Hand taping or even use of tape dispensing tools frequently require that the operator's arm be extended to one degree or another in the immediate vicinity of such live cables. It may thus be very hazardous or even impossible to accomplish proper taping of a splice by hand or with a hand held tool.

Accordingly, one of the objects of the present invention is to provide a light and compact taping machine which fits in tight spaces and does not require an operator's constant grip to operate.

A second object is to provide an improved taping machine which is readily assembled and disassembled.

A third object is to provide an improved taping machine which may be operated by one person.

Another object is to provide an improved taping machine which is supported on an environmental surface, eliminating mounting upon the cable being taped.

Still another object is to provide an improved taping machine which supports the cable during the taping operation.

A next object is to provide an improved taping machine having automated tape dispensing and application.

Yet another object is to provide an improved taping machine providing independent control of the rates of tape feed and of axial travel of the point of tape application.

An additional object is to provide an improved taping machine having selectively an adjustable and a constant rate of tape feed.

A further object is to provide an improved taping machine having selectively an adjustable and a constant rate of axial travel of the point of tape application.

A still further object is to provide an improved taping machine having the ability to maintain tape in position for application independent of an operator's grip.

With these and other objects in view which will more readily appear as the nature of the invention is better understood, the invention consists in the novel combination and assembly of parts hereinafter more fully described, illustrated, and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
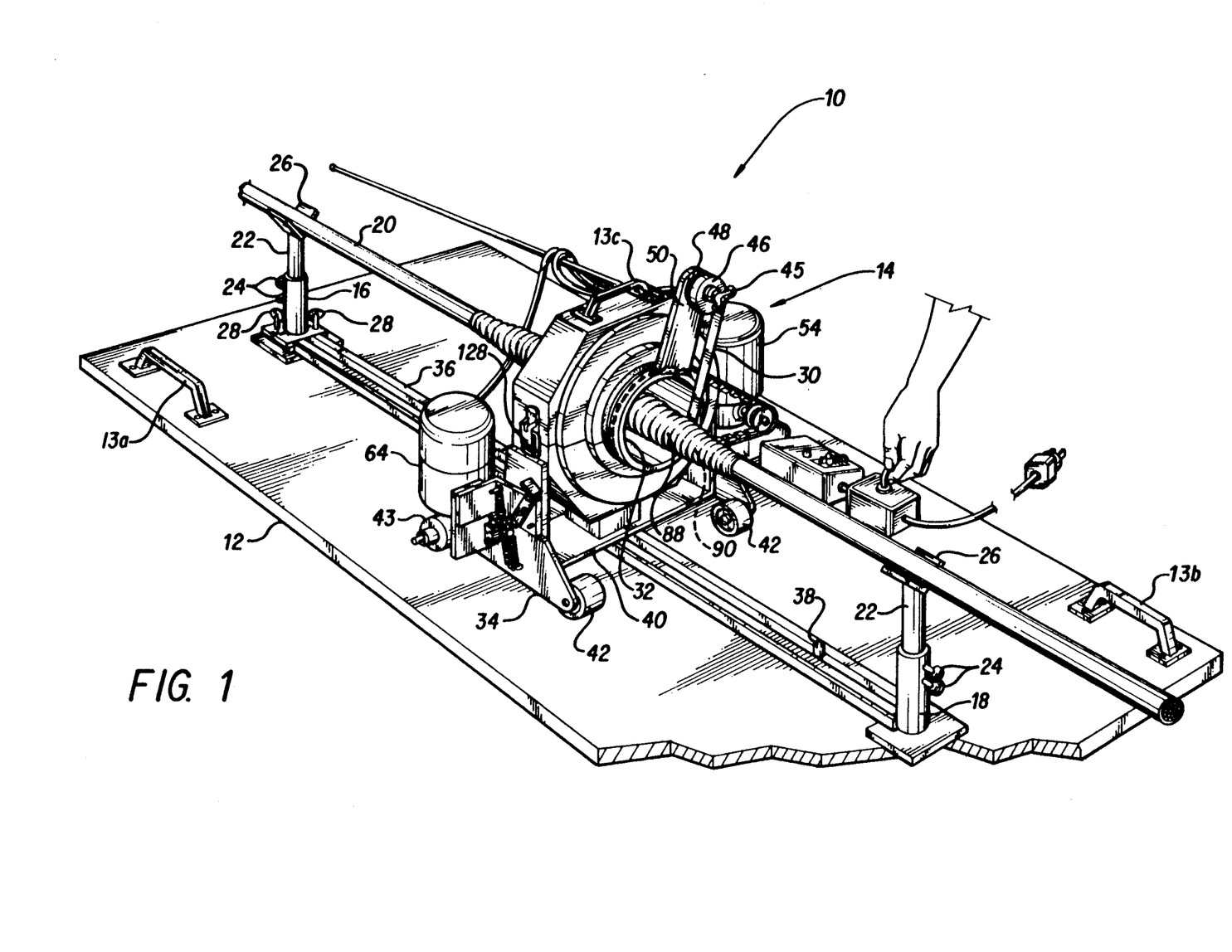
FIGS. 1 and 2 are perspective views of the invention in its environment.

The taping machine 10 of the present invention may be seen in FIG. 1 to include a planar base 12 and a traveling tape supply assembly 14 attached thereto. Affixed to this planar base 12 are a removable and a fixed stand 16,18 which serve to support a cable 20. These stands 16,18 are adjustable with respect to height to permit centering of cables 20 of different sizes in the taping machine 10. Upper portions 22 of the stands 16,18 are secured in place by thumbscrews 24 to provide this adjustment. The cable 20 sits on the stand upper portions 22, the top surface 26 of the stand upper portions 22 having "V" configuration. One stand 16 is removable from the base 12 by means of thumbscrews 28.

Handles 13a,13b (mounted on the planar base 12) and 13c (mounted on a movable drum carriage assembly 34) facilitate maneuvering these components 12,34.

In operation, the taping machine 10, having been assembled on site, dispenses and applies tape 30 by means comprising a rotating drum 32 carried on a movable drum carriage assembly 34.

Figure 5:
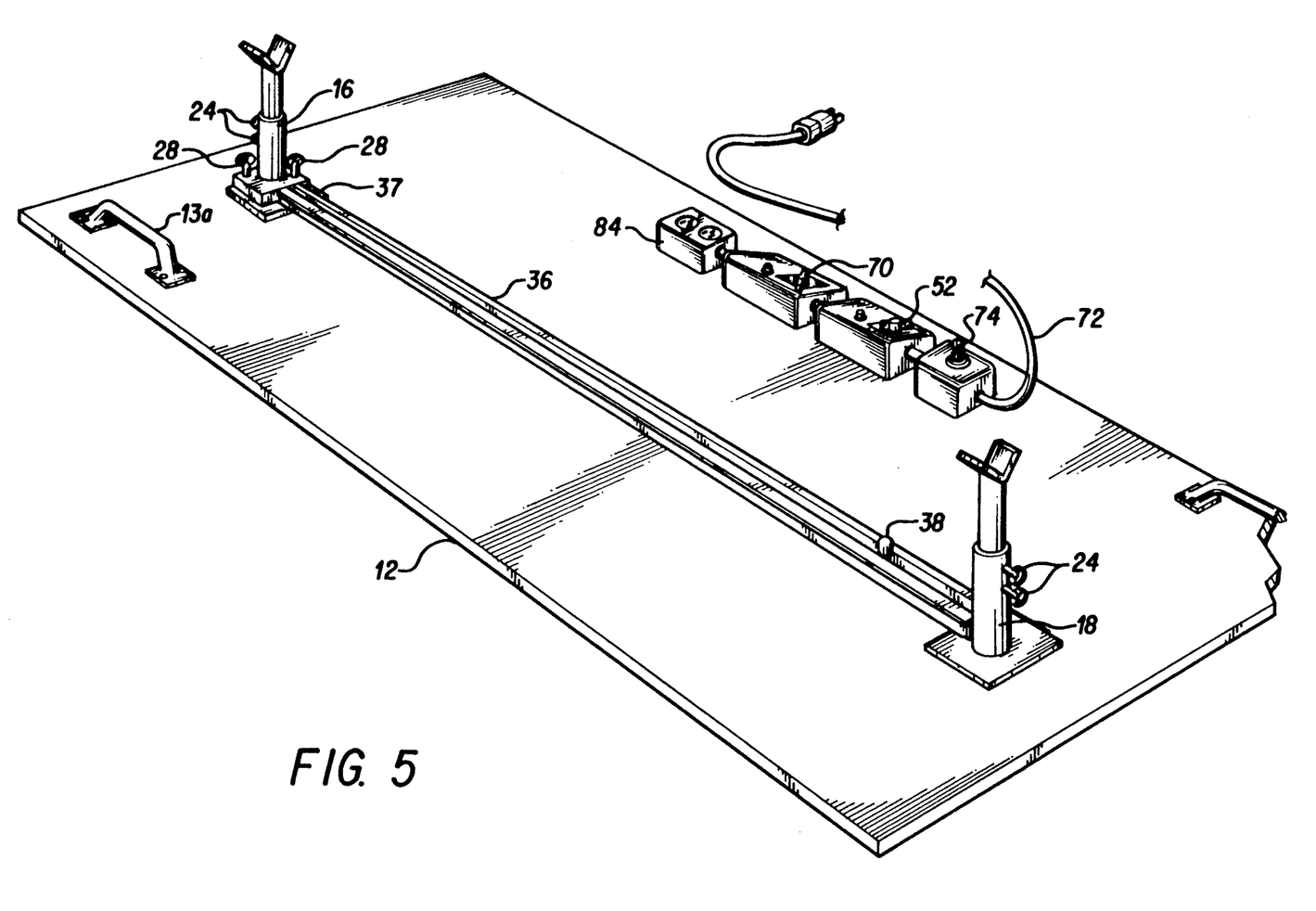
FIG. 5 is a perspective view of the fixed parts of the invention.

The drum carriage assembly 34 moves along the planar base 12, guided by a track 36, applying tape 30 to the cable 20, which will be further explained later. Better seen in FIG. 5, the track 36 and the stands 16,18 are fixed to the planar base 12, this assemblage 12,16,18 comprising the stationary portion of the invention 10. The track 36 is secured to the planar base 12 of the invention 10, spanning the stands 16,18. A stop 38 disposed on the track 36 limits travel of the drum carriage assembly 34 on the side 40 dispensing tape 30, thus preventing possible collision with the stand 18.

Figure 3:
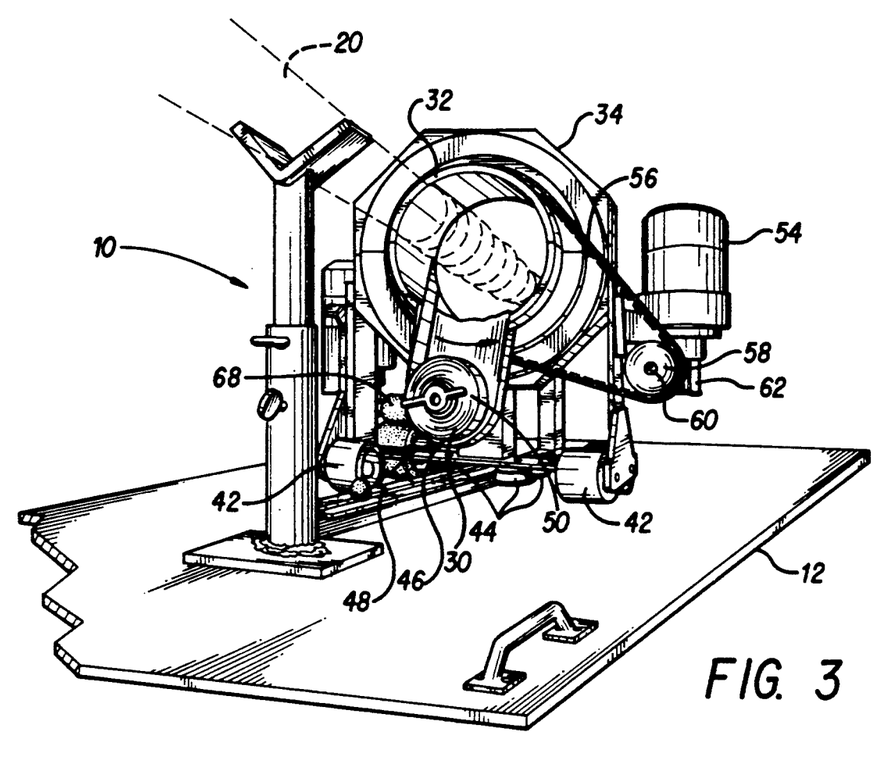
FIG. 3 is a perspective view of the drum carriage assembly.

The drum carriage assembly 34 moves along the track 36 on the planar base 12 on travel rollers 42, being guided by guide rollers 44. Travel rollers 42 and guide rollers 44 are best seen in FIG. 3.

Tape 30 application proceeds as follows. The drum carriage assembly 34, which carries a supply of tape 30 on a spool 46, surrounds the cable 20. The spool 46, being supported on the drum 32 at the end 48 of an arm 50, moves around the cable 20 in planetary fashion when the drum 32 is caused to rotate. Tape 30, which has been manually adhered to the cable 20 to start the application, is stretched taut and winds around the cable 20. As the drum carriage assembly 34 moves along the cable 20 with the drum 32 constantly rotating, the cable 20 is thus progressively wrapped with tape 30.

Figure 8:
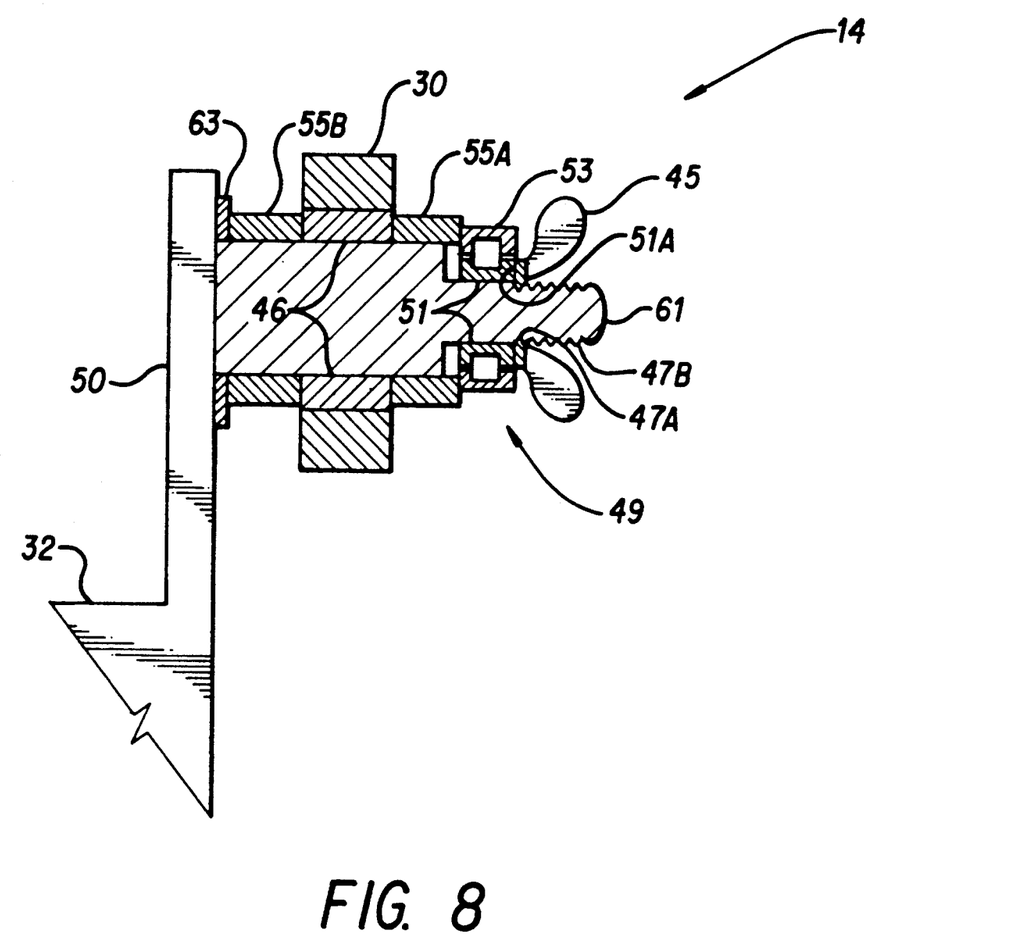
FIG. 8 is a cross sectional side view detail of the tape supply assembly also shown in smaller scale in FIG. 1.

Tape tension is maintained by the following arrangement, best shown in FIG. 8. A tape supply assembly 14, also shown in FIG. 1, has a wingnut 45 fastened by threads 47A to a support shaft 61 having cooperating threads 47B. The wingnut 45 both retains the tape spool 46 in place and also adjusts tension without rotating the retaining wingnut 45 on the support shaft threads 47B. A roller bearing assembly 49 having an internal race 51 and an external race 53 is interposed between the wingnut 45 and a spacer 55A with the internal race 51 contacting the spacer 55A. This location provides surface contact between the wingnut 45 and the taping machine 10 only at a surface 51A of the internal race 51. The wingnut 45 and internal race 51 remain immobile relative to the support shaft 61 to which the wingnut 45 is threaded. The external race 53 contacts the spacer 55A; both the external race 53 and the spacer 55A rotate relative to the internal race 51. The spacer 55A contacts the tape spool 46, which in turn contacts a second spacer 55B. A washer 63 separates the spacer 55B from the arm 50. The wingnut 45, which is adjusted to provide desired tension, is thus isolated from contact with the rotating tape spool 46 and is thus not subject to drag that would influence tightness of the wingnut 45. The tape 30 is free to rotate to accommodate feed while being prevented from contacting the taping machine 10, and possibly adhering thereto.

Figures 4, 7:
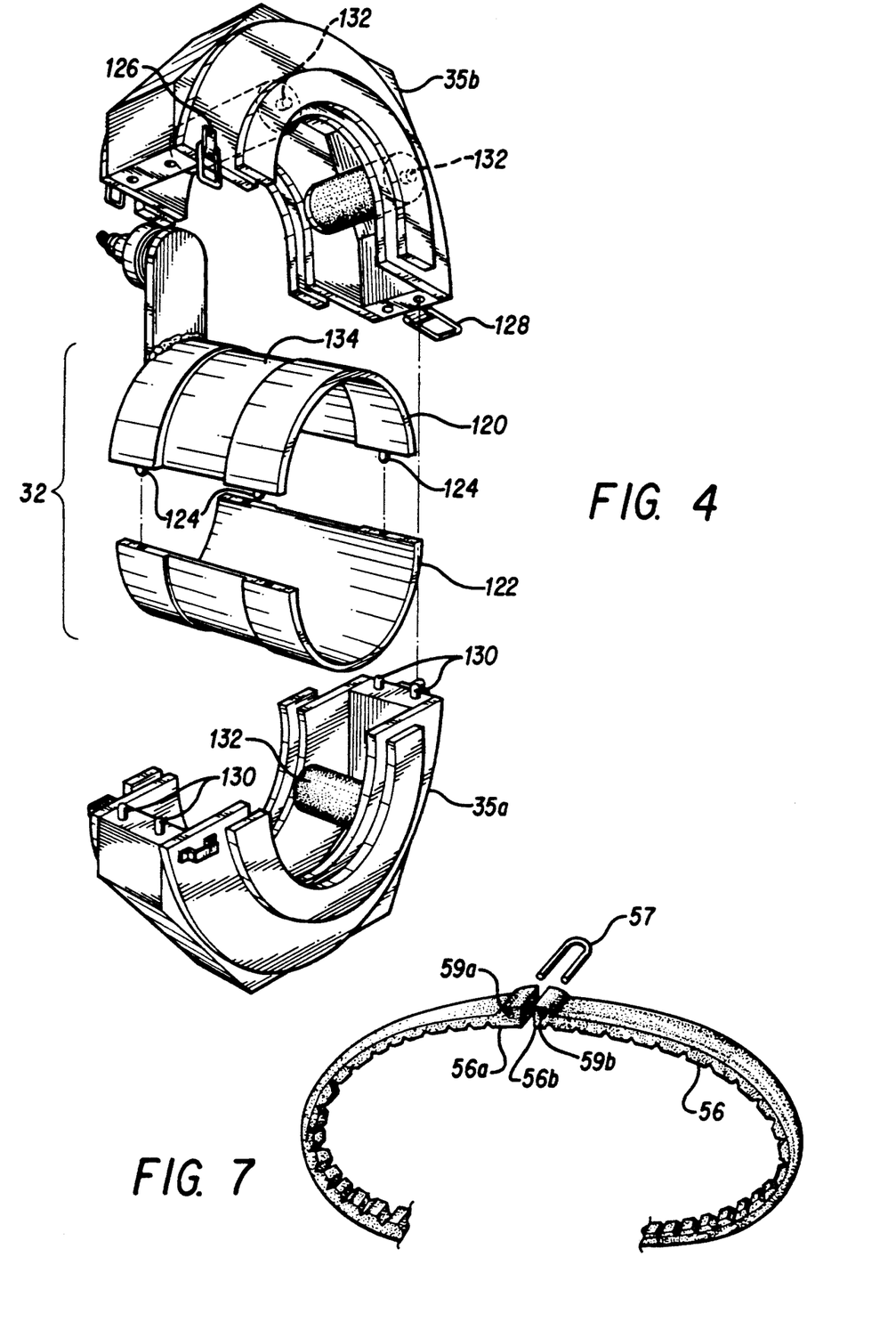
FIG. 4 is an exploded view of the drum carriage assembly.
FIG. 7 is a partial perspective detail of the drive belt.

Control of the taping machine 10 will now be explained. Rotation of the drum 32 is controlled by a feed rate switch 52, which governs the speed of a feed motor 54 carried on the drum carriage assembly 34. A drive belt 56, connected to the feed motor 54 by means of a pulley 58 fixed to the output shaft 60 of a gearbox 62 driven by the feed motor 54, is looped around the drum 32. The drive belt 56 is of split construction as shown in FIG. 7 so that it may be installed over the cable 20 and the drum 32 even though the cable 20 has ends that are inaccessible. The drive belt 56 is assembled with a clip or wire 57 penetrating bores 59a,59b located in each end 56a,56b of the drive belt 56. These drum driving components 54,56,58,60,62 are best seen in FIG. 3.

Axial travel of the drum carriage assembly 34 is accomplished by driving a travel roller 43 by a travel motor 64 via its respective gearbox 66 and an intermediate roller 68. Travel motor 64 speed is controlled by a travel speed switch 70. Refer again to FIG. 2 for the driving components 43,64,66,68.

Tests have shown that fractional horsepower motors will satisfy power requirements of the feed motor 54 and the travel motor 64.

The feed rate and travel speed switches 52,70 are mounted on the planar base 12. A main power cord 72 is plugged into an external power source (not shown), bringing electrical power through a main shutoff switch 74 to an AC to DC converter 76 and thence to the feed rate and travel speed switches 52,70. These switches 52,70, which comprise variable voltage transformers 78, in turn supply variable voltage power to respective floating power cords 80,82 via a duplex power receptacle 84 mounted on the planar base 12 proximate the switches 52,70. These electrical components 52,70,72,74,76,78 are most clearly seen in FIGS. 2 and 5.

Figure 2:
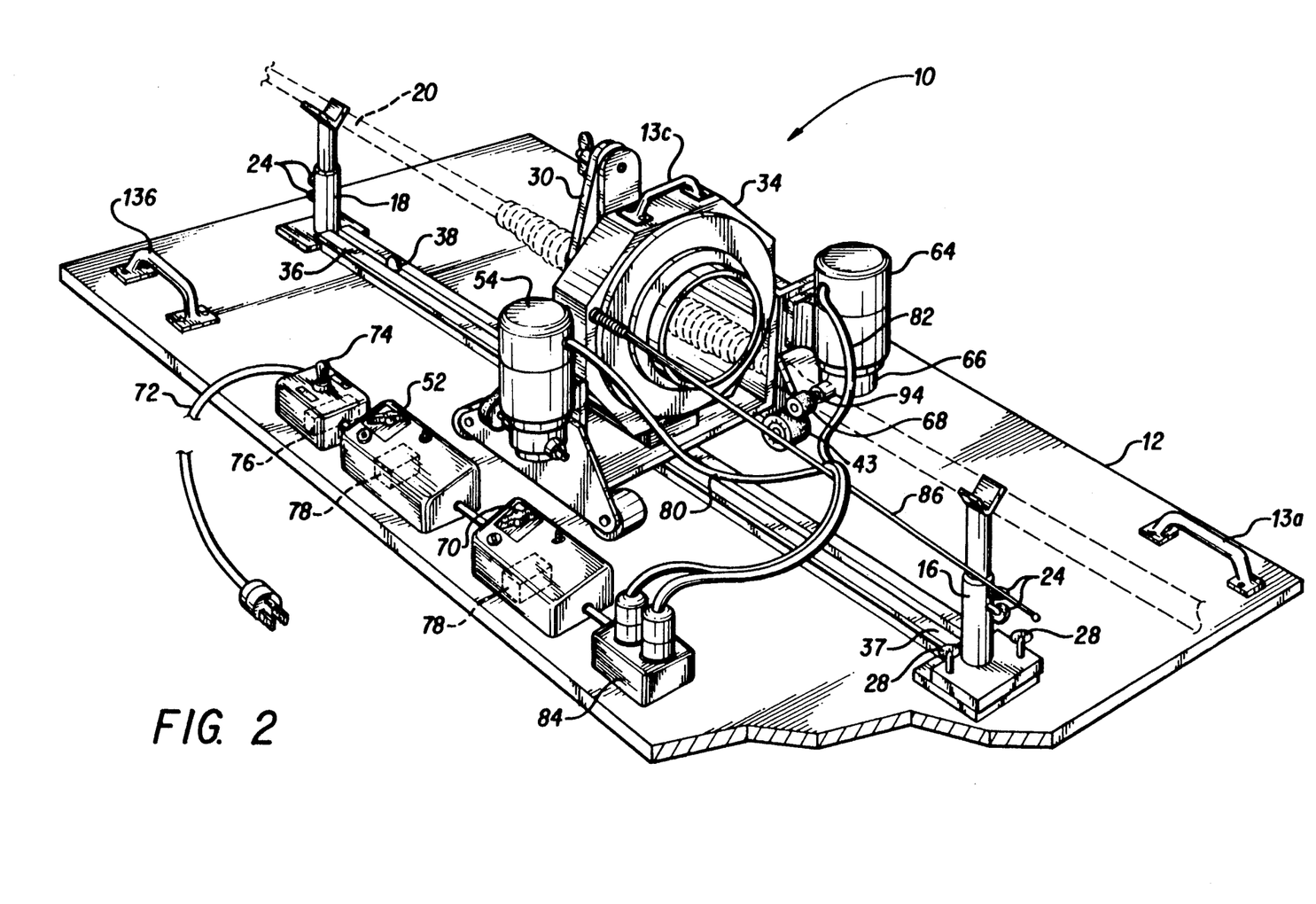

A cord guide 86 holds the floating power cords 80,82 away from incidental contact with the stand 16, the floating power cords 80,82 overhanging the track 36 as they extend from the duplex power receptacle 84 to their respective feed rate and travel motors 54,64. The cords 72,80,82 and cord guide 86 are best illustrated in FIG. 2.

A user may thus control the tape feed rate by one switch 52 and the speed at which the drum carriage assembly 34 moves along the cable 20 by a separate switch 70. Varying the travel speed at a given rate of tape feed varies the degree of overlap of each succeeding layer 88 of tape 30 on the previous layer 90.

This is an advance in the art since a user is free to adjust the rate of application of tape 30 without having to concentrate on and exert effort maintaining tape tension or on the rate of axial travel. The user is also free to ignore nearby live cables, focusing his entire attention to his work.

Assembly of the taping machine 10 on the job site from its main components 12,34 is easily accomplished. First, the planar base 12 may be set advantageously in place. Since the planar base 12 has minimal protruding structure, it may easily be maneuvered, even in confined spaces. If space permits, the lower portion 35a of the drum carriage assembly 34 may be left installed on the track 36. The lower portion 35a includes all of the drum carriage assembly 34 such as a frame 39, rollers 42,43, and motors 54,64, with the exception of the separable top portion 35b.

Next, if removal of the lower portion 35a of the drum carriage assembly 34 was necessary, lower portion 35a may be reinstalled below the cable 20 and straddling the track 36. One stand 16 is removed from the planar base 12 by thumbscrews 28, yielding access to end 37 of the track 36. The carriage assembly guide rollers 44 may then be placed to surround the track 36, and the carriage assembly 34 may be rolled into a desired location, preferably toward the middle of the planar base 12. The stand 16 is then replaced.

To roll the drum carriage assembly 34 along the track 36 manually, the travel motor 64 must be disengaged from its driven travel roller 43. The travel motor 64 is pivotally mounted on the drum carriage assembly 34 so that the intermediate roller 68 disposed on the travel motor gearbox output shaft 94 may be swung into and out of contact with the driven travel roller 43. An "L" shaped member 96 supporting the travel motor 64 pivots on a stationary bolt 98. A notch 100 in an arm 102 pivotally fixed to the drum carriage assembly 34 engages a stud 104 fixed to the "L" shaped member 96. A spring 106 is mounted at its proximal end 108 in tension to the free end 110 of the arm 102 and fixed at its distal end 112 to the drum carriage assembly 34. This spring 106 exerts a force biasing the "L" shaped member 96 and travel motor 64 into tight abutment with the driven travel roller 43.

Figure 6:
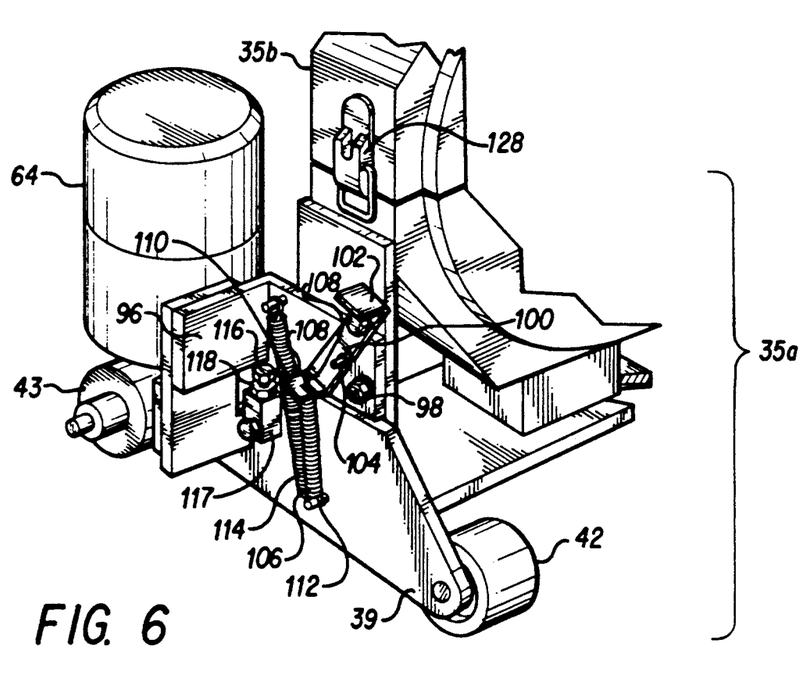
FIG. 6 is an enlarged partial perspective view of FIG. 1.

Turning now to FIG. 6, disengagement of the travel motor 64 with the driven roller 43 will be discussed. To roll the drum carriage assembly 34 manually along the track 36, the travel motor 64 is manually swung up out of contact with the driven travel roller 43. Less than one inch of swing of the travel motor 64 moves the "L" shaped member 96 out of the drive position and past a dead center. Once past the dead center, the travel motor 64 is no longer biased into contact with the driven travel roller 43. The "L" shaped member 96 is then held in a disengaged position by a second spring 114. By this arrangement, no tools are needed either to secure the travel motor 64 when disengaged, nor to maintain a bias when engaged.

Maximum downward swing of the travel motor 64 into an engaged, or drive, position is limited by a screw 116 secured in place by a locknut 118, the screw 116 threading into a block 117. The block 117 is mounted on the drum carriage assembly 34 just below the "L" shaped member 96.

Upper and lower shells 120,122 of the drum 32 are assembled in place on the drum carriage assembly 34. The precision of this fit is provided by dowels 124. The interrelation of upper and lower shells 120,122 and top and lower portions 35b,35a of the drum carriage assembly 34 is illustrated in FIG. 4.

Finally, the top portion 35b of the drum carriage assembly 34 may be fixed by latches 126,128 to the lower portion 35a, thus surrounding the cable 20. Again, a precise fit is maintained by dowels 130. Rollers 132 carried in the drum carriage assembly 34 support the drum 32 within the drum carriage assembly 34. These rollers 132 further control thrust of the drum 32 by riding in and being retained by a wide, shallow groove 134 in the drum 32. Both upper and lower portions 35b,35a of the drum carriage assembly 34 are of minimal bulk, adding only slightly to the dimensions of the assembled taping machine 10.

Only electrical connections must be made to render the taping machine 10 functional. The feed and travel motors 54,64 have floating power cords 80,82 which may be plugged into the duplex power receptacle 84 mounted on the planar base 12. The main power cord 72 is then plugged into a source of electrical power (not shown), and the taping machine 10 may be operated.

Thus it will be appreciated that the entire assembly process requires tightening of only two stand removal thumbscrews 28, four stand height adjustment thumbscrews 24, two drum carriage latches 126,128, and plugging three cords 72,80,82 into electrical receptacles 84 (external power source not shown). In many cases, removal of the drum carriage assembly lower portion 35a from the track 36 is not required, and the stand removal thumb-screws 28 need not be handled.

It is to be understood that the present invention is not limited to the sole embodiment described above, but encompasses any and all embodiments within the scope of the following claims.

I claim:

1. An apparatus for uniformly taping with a constant overlap of tape a spliced electric cable member having a longitudinally elongated splice and opposed intermediate ends, comprising:
   a stationary base;
   support means on said base, for supporting said spliced electric cable member parallel to said base and intermediate the ends of said spliced electric cable member, said support means being removably fixed on said base to facilitate assembly and disassembly of said apparatus about said electric cable member;
   tape means, removably supported on said base, for uniformly wrapping said splice of said electric cable member with tape throughout the length thereof, said tape means being rotatable around said spliced electric cable member, and movable on said base relative to said spliced electric cable member only along a straight line longitudinal direction of said spliced electric cable member, said tape means has means automatically holding said tape at a desired degree of tension to ensure said uniform winding of said tape;

rotary means, coupled to said tape means, for rotating said tape means at a predetermined rotating speed around said spliced electric cable member, said rotary means comprising a pair of upper and lower shells which are readily assembled and disassembled at said job site about said electric cable member being spliced;

mobile means, coupled to said tape means, for moving said tape means at a predetermined moving speed on said base only in a continuous straight line along said longitudinal direction of said spliced electric cable member; and control means, removably supported by said base and coupled to said rotary means and said mobile means, for independently controlling operations of said rotary means and said mobile means so as to adjust said predetermined rotating speed and said predetermined moving speed; whereby said apparatus is uniformly shiftable in said straight line longitudinal direction relative to said spliced electric cable member while supporting the spliced electric cable member to ensure said uniform winding of said tape; and said apparatus is easily assembled at a job site.

2. The apparatus according to claim 1, wherein said support means comprises a pair of stands, and at least one of said stands is fixed on said base.

3. The apparatus according to claim 2, wherein said tape means comprises:

a rail member laid between said stands while arranged parallel to the longitudinal direction of the spliced electric cable member; and a roller slidably engaged with said rail member.

4. The apparatus according to claim 1, wherein said base comprises at least one handle so as to be transferred thereby.

5. The apparatus according to claim 1, wherein said rotary means, said mobile means, and said control means are fixed on the tape means, and said tape means comprises at least one handle so that said tape means, said rotary means, said mobile means, and said control means can be carried together by said at least one handle.

6. The apparatus according to claim 3, wherein said tape means further comprises a stop on said rail member so that said tape means can be prevented from colliding with at least one of said stands.

7. The apparatus according to claim 1, further comprising height changing means, coupled to said support means, for adjusting a position relationship between said spliced electric cable member and said tape means.

8. The apparatus according to claim 7, wherein said support means comprises a pair of stands, at least one of which is fixed on said base, and said height changing means comprises screw means for changing a height of each of said stands.

9. The apparatus according to claim 1, further comprising tape supply means, coupled to said tape means, for supplying the tape to said tape means when the tape is exhausted from said tape means.

10. The apparatus according to claim 1, wherein said tape means further comprises tape-tension changing means for adjusting tension of the tape wound around the said spliced electric cable member.

11. The apparatus according to claim 1, wherein said tape means comprises engageable first and second members, said first member engageable with said second member forming an opening through which the spliced electric cable member is supported by said support means, said opening being opened when said first member is disengaged from said second member so as to load and remove the spliced electric cable member to and from said opening.

* * * * *